United States Patent [19]
Pacholok

[11] Patent Number: 5,645,137
[45] Date of Patent: Jul. 8, 1997

[54] COMPACT, PORTABLE, VEHICLE DISABLING DEVICE AND METHOD

[76] Inventor: David R. Pacholok, 1815 W. Higgins Rd., Sleepy Hollow, Ill. 60118

[21] Appl. No.: 622,388

[22] Filed: Mar. 27, 1996

[51] Int. Cl.⁶ ............................................. B60R 25/00
[52] U.S. Cl. ....................... 180/287; 89/1.11; 280/279
[58] Field of Search ............................. 180/279, 287

[56] References Cited

U.S. PATENT DOCUMENTS

4,967,862  11/1990  Pong et al. ................... 180/279
5,503,059   4/1996  Pacholok ...................... 89/1.11

*Primary Examiner*—Kenneth R. Rice
*Attorney, Agent, or Firm*—Mathew R. P. Perrone, Jr.

[57] ABSTRACT

A compact and portable device is easily attached to and concealed on a vehicle and capable of disrupting the electronic systems required for vehicle operation.

24 Claims, 5 Drawing Sheets

COMPACT, PORTABLE, VEHICLE DISABLING DEVICE AND METHOD

This invention relates to a compact portable device for disabling a vehicle and more particularly to a compact portable device, which is easily attached to a vehicle and may temporarily disable that vehicle.

BACKGROUND OF THE INVENTION

In many cases, it is highly desirable to disable a vehicle. This is especially true in the law enforcement field. Many devices are known which will completely disable a vehicle. A very effective, completely disabling device is disclosed in U.S. Pat. No. 5,503,059, by the inventor of this application, the patent being incorporated herein by reference.

This completely disabling a vehicle may not always be desired. What is desirable sometimes is a device to efficiently disable, without causing permanent damage to, the vehicle. This device must be easily attached to the vehicle.

This device must be compact. Such compactness provides for simplified transportation to a site, with easily obtained concealment capability. Combined with ease of attachment to any vehicle, great advantages can be obtained.

Typical example of a use for a device with these capabilities, is quick attachment thereof to a proposed get away vehicle in a hostage situation. If this device can be developed and easily concealed on a vehicle in order to disable it, great advantages can be obtained. The vehicle selected by the perpetrator can be quickly set up to be selectively disabled.

One of the problems with a device to disable a vehicle is that there is chance that such a device can cause electric shock or heart fibrillation in the person handling the device. It is well settled that heart fibrillation or electric shock is highly undesirable occurrence for a person. However, the high voltages desired for such a device, combined with the required human contact for installing the device create these problems. The currents and voltages produced by such a device can seriously harm or even kill a person in this manner. It is desirable to avoid, or least minimize that problem in a simple fashion.

SUMMARY OF THE INVENTION

Therefore, among the many objectives of this invention is to provide a device for selectively and temporarily disabling a vehicle.

A further objective of this invention is to provide a device, which may be quickly attached to a vehicle.

A still further objective of this invention is to provide a device, which may be quickly removed from a vehicle.

Yet a further objective of this invention is to provide a device for use in a hostage situation.

Also an objective of this invention is to provide a method for temporarily disabling a vehicle.

Another objective of this invention is to provide a method for quickly attaching a device to a vehicle.

Yet another objective of this invention is to provide a method for quickly removing a device from a vehicle.

Still another objective of this invention is to provide a compact, vehicle-disabling device.

A further objective of this invention is to provide a device, which minimizes the chance of heart fibrillation.

A still further objective of this invention is to provide a device, which minimizes the chance of electric shock to a person handling the device.

These and other objectives of the invention (which other objectives become clear by consideration of the specification, claims and drawings as a whole) are met by providing a device, which is both compact and portable, easily attached to and concealed on vehicle and capable of disrupting the electronic systems required for vehicle operation.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

The portable disabling device includes a housing. Within the housing are mounted a direct current power source, a radio control receiver, a high voltage direct current power supply, an energy storage capacitor or pulse forming network, a fast high voltage switch, and two electrodes.

The direct current power source is connected in standard fashion to the radio control receiver. There is a switch connected between the direct current power source and the high voltage direct current power supply. The high voltage direct current power supply is connected in a standard fashion to the energy storage capacitor or pulse forming network. This, in turn, is connected at one lead to the fast high voltage switch and a first electrode. A second electrode is also standardly connect to the energy storage capacitor, which may optionally have a high energy voltage switch therebetween.

More preferably, within the housing are mounted a battery, an antenna, a radio control receiver, a safety arming switch, an inverter, a step up transformer, a high voltage multiplier or rectifier, two isolation resistors, an energy storage capacitor or pulse forming network, at least one spark gap or other high voltage switching device connected to a securing device such as a magnet and a second magnet. Also typical of a high voltage switching devices are bulk avalanche semiconductor switch and a silicon controlled rectifier network. Such switches react swiftly, usually in matter of nanoseconds to stimulation. If desired, an inductor is also used.

More particularly, within the housing is the radio receiver. Operably connected to the radio receiver is an antenna to receive a signal from a remote device. The device may thus be activated as desired when attached to the vehicle.

If desired, the radio control may be replaced with any suitable receiving device. A typical device may be selected from the group consisting of an acoustic receiver, a light receiver, an infrared receiver, and similar devices. The key aspect of a receiving device is that it small enough fit into the housing and have sufficient control for suitable sending device to permit disablement at a desired time.

With the receiving device, an appropriate sending device is required. The sending device must have a useful range for the receiving device, and hence the vehicle disabling device to be effective.

If it is desired to avoid the use of a sending device, the receiving device may be replaced a timer. The timer may then disable the vehicle at a predetermined time.

The inductor and the safety arming switch combine to provide safety so the device cannot cause heart fibrillation in a person handling the same. The safety arming switch may be activated just before attachment to the vehicle.

Additionally, the housing has a battery mounted therein in a standard fashion. The battery is connected to the radio control receiver and to the inverter. An inverter switch selectively interrupts the circuit between the battery and the inverter.

Operably connected to the radio control receiver is the antenna and the safety arming switch. Upon activation of the safety arming switch, the radio control receiver can receive the remote signal through the antenna.

The inverter converts the battery current to alternating current. The step up transformer or high voltage multiplier or rectifier raises the voltage to a level sufficient to disrupt the vehicle operation. The disruption voltage is in the range of about 3,000 volts to about 50,000 volts, if it desired to temporarily disable the vehicle. More preferably, the disruption voltage is in the range of about 12,000 volts to about 24,000 volts, if it desired to temporarily disable the vehicle. Most preferably, the disruption voltage is in the range of about 18,000 volts to about 22,000 volts, if it desired to temporarily disable the vehicle.

From the voltage multiplier come a first lead connector and a second lead connector. Within the first lead connector is a first isolation resistor or inductor. Within the second lead connector is a second isolation resistor or inductor. Beyond the first lead connector and the second lead connector, and oppositely disposed from the voltage multiplier is the energy storage capacitor. The energy storage capacitor connects the first lead connector and the second lead connector.

The first lead connector then has a first spark gap connected to a first securing device beyond the capacitor. The first securing device permits the disabling device to be secured to a vehicle. The securing device may be a magnet, a glue assembly or other attaching device.

Likewise, the second lead connector includes the second securing device beyond the capacitor. A second spark gap or other high voltage switching device is optionally placed between the capacitor and the second securing device. The first securing device and the second securing device may be the same or different.

The inductor optionally connects also the first lead connector and the second lead connector. This inductor is connected to the lead conductor between the first spark gap or other high voltage switching device and the first securing device. The inductor and the safety arming switch combine to provide safety so the device cannot cause fibrillation in a person handling the same. The safety arming switch may be activated just before attachment to the vehicle.

Figure 1:
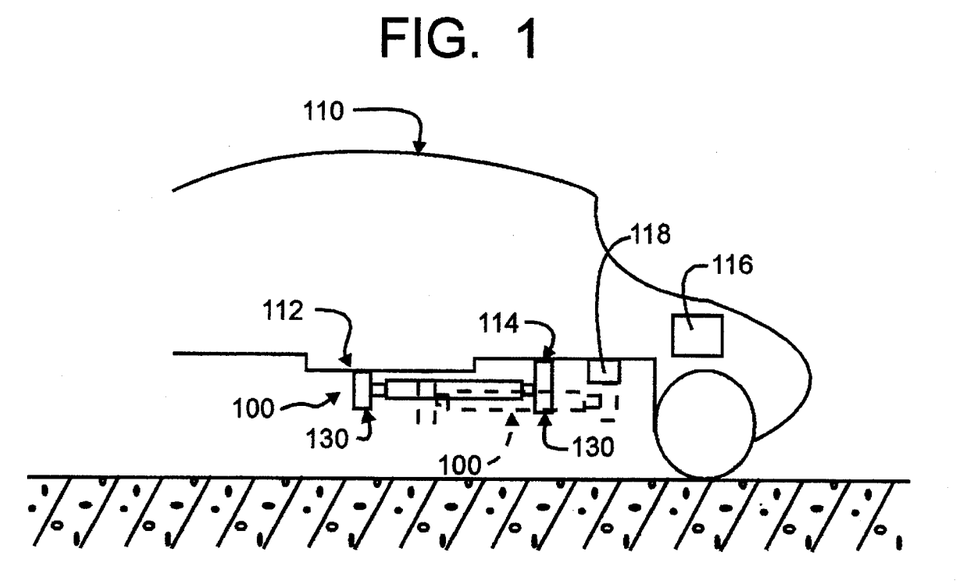
FIG. 1 depicts a perspective view of device 100 secured to a vehicle 110.

In FIG. 1, device 100 is secured to a vehicle 110 by magnet assembly 130. Magnet assembly 130 assembly includes a first magnet 132 at a first end of device 100 and a second magnet 134. First magnet 132 is oppositely disposed from second magnet 134. First magnet 132 is removably secured to oil pan 112 of vehicle 110. Second magnet 134 is removably secured to unibody or frame 114 of vehicle 110.

An alternative to the oil pan 112 for an attaching point of first magnet 132 is the engine block 118 or the transmission pan 116. As long as one part of magnet assembly 130 is secured to the oil pan 112 or an alternative, and the opposing part is secured elsewhere on a conducting part of the vehicle 110, the circuit may be completed and the device 100 activated.

Figure 2:
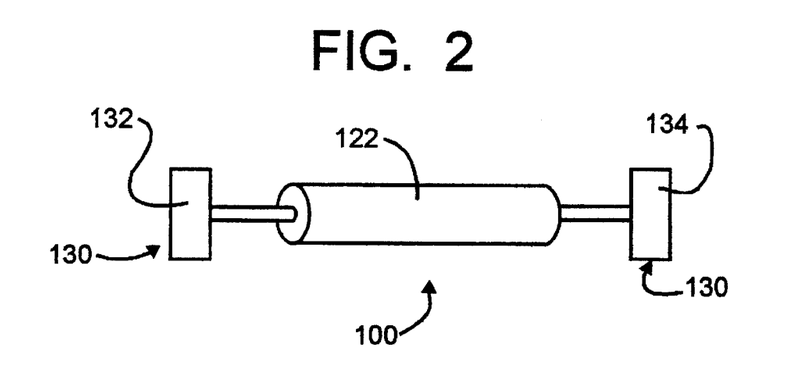
FIG. 2 depicts a perspective view of device 100.

With FIG. 2, the appearance of the device 100 becomes clear. Device 100 includes a housing 122. First magnet 132 and second magnet 134 extend from opposing ends of housing 122. Housing 122 may contain either first circuit 120 (FIG. 3) or second circuit 200 (FIG. 4) or third circuit 250 (FIG. 5) as desired.

Figure 3:
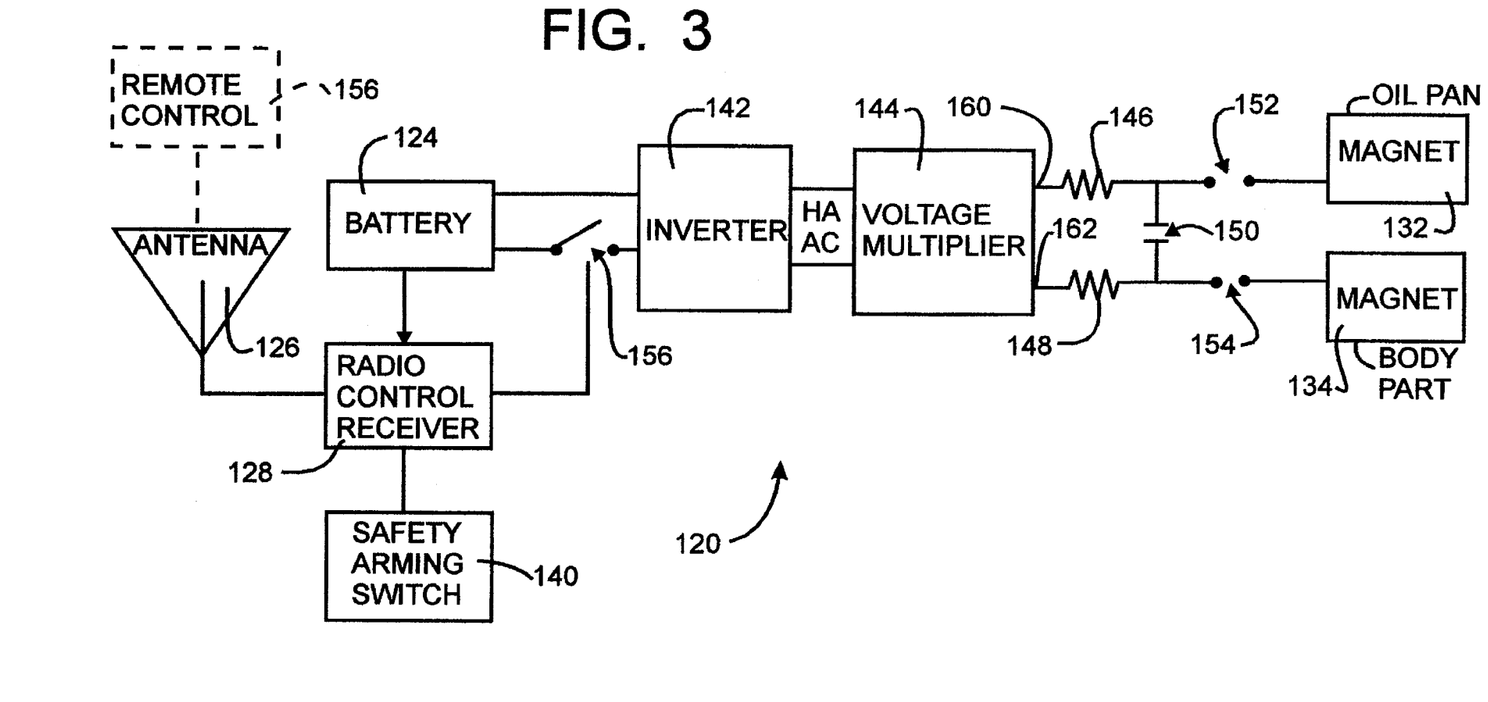
FIG. 3 depicts a first circuit 120 for device 100.

As FIG. 3 depicts the first circuit 120 for device 100. The portable disabling device 100 includes the housing 122. Within the housing 122 are mounted a battery 124, an antenna 126, a radio control receiver 128, a safety arming switch 140, an inverter 142 (or step up transformer), a high voltage alternating current multiplier 144 (or rectifier), a first isolation resistor 146 (or inductor), a second isolation resistor 148 (or inductor), an energy storage capacitor 150 or pulse forming network, a first spark gap 152 (or high voltage switching device) connected to a securing device such as a first magnet 132. Alternatively a second spark gap 154 (or high voltage switching device) may be connected to second magnet 134.

More particularly, within the housing 122 is the radio control receiver 128, mounted in a standard fashion. Operably connected to the radio control receiver 128 is antenna 126 to receive a signal from a remote device 156. The device 100 may thus be activated by the remote device 156 as desired when attached to the vehicle 110.

Power for the device 100 is in the housing 122 thanks to battery 124 mounted therein in a standard fashion. The battery 124 is connected to the radio control receiver 128 and to the inverter 142. An inverter switch 158, standardly mounted therebetween selectively interrupts the circuit between the battery 124 and the inverter 142.

Operably connected to the radio control receiver 128 is the antenna 126 and the safety arming switch 140. Upon activation of the safety arming switch 140, the radio control receiver 128 can receive the remote signal from the remote device 156 through the antenna 126.

From the voltage multiplier 144 come a first lead connector 160 and a second lead connector 162. Within the first lead connector 160 is a first isolation resistor 146. Within the second lead connector 162 is a second isolation resistor 148. Connecting the first lead connector 160 and the second lead connector 162, and oppositely disposed from the voltage multiplier 144 (or rectifier) is the energy storage capacitor 150. The energy storage capacitor 150 connects the first lead connector 160 and the second lead connector 162.

The first lead connector 160 includes first spark gap 152 therein connected to a first securing device, such as first magnet 132 beyond the capacitor 150. The first magnet 132 is preferably secured to oil pan 112 of vehicle 110. Second magnet 134 is secured to frame 114 of vehicle 110. Second magnet 134 may be attached to any other metallic part of vehicle 110.

Likewise, the second lead connector 162 has second magnet 134 beyond the capacitor 150. If desired, second spark gap 154 may optionally be placed between the capacitor 150 and the second magnet 134.

Figure 4:
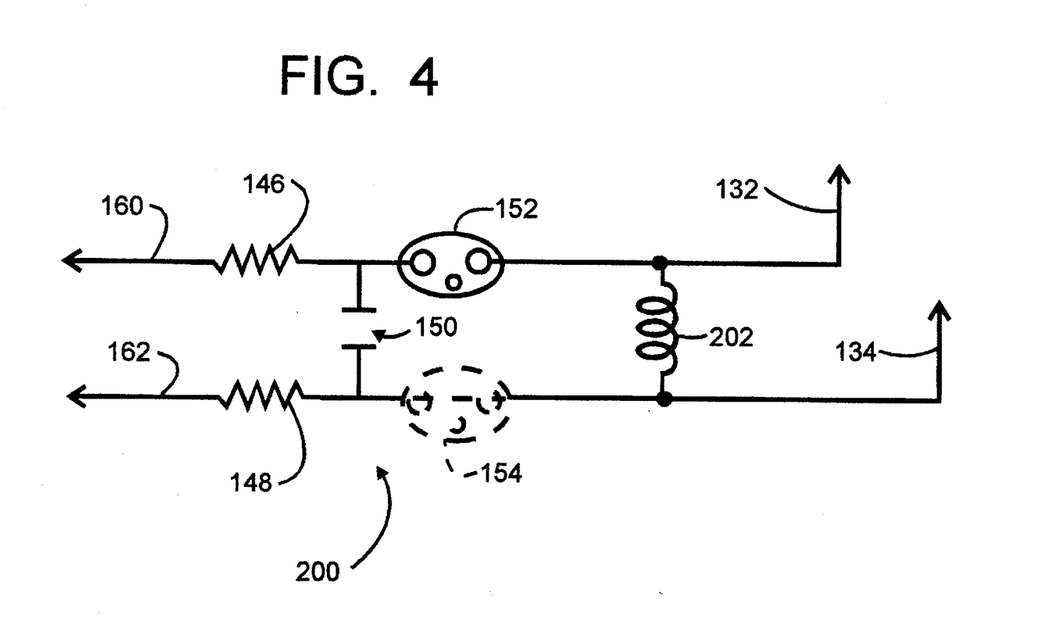
FIG. 4 depicts a second circuit 200 for device 100.

The main difference in FIG. 4 and FIG. 3 is that FIG. 4 depicts a second circuit 200 for device 100. Second circuit 200 includes an inductor 202 and the safety arming switch 140 combine to provide safety so the device 100 cannot cause fibrillation in or electric shock to a person handling the same. The safety arming switch 140 may be activated just before attachment to the vehicle 100.

Figure 5:
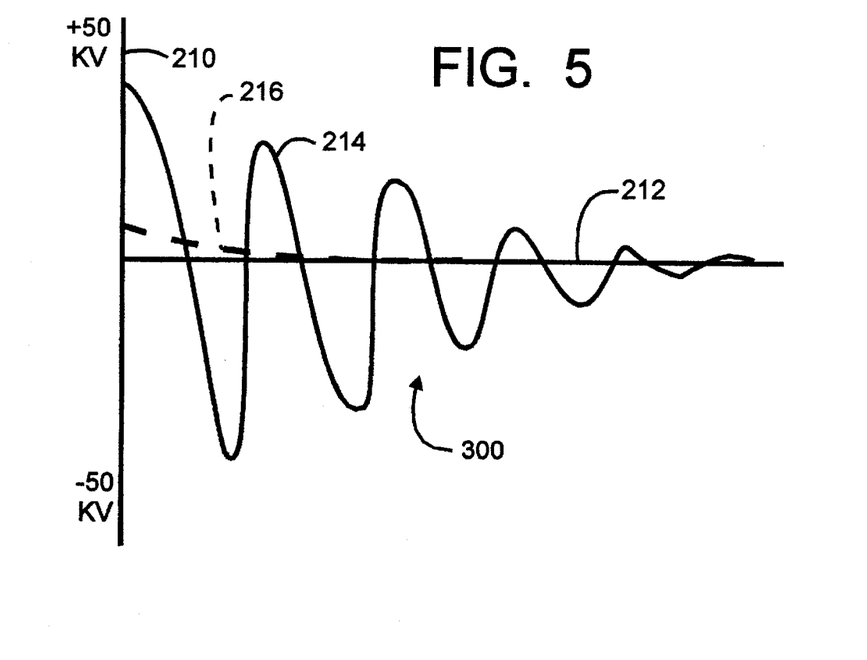
FIG. 5 depicts device wave form 300 for second circuit 200.

The fibrillation or electric shock is prevented as shown in FIG. 5, because the inductor 202 acts as a direct current short circuit to the composite high frequency ringing and exponentially decaying direct current components. These direct current components result from the discharge of the capacitor. As the direct current component has no effect on the vehicle disablement, but may cause electric shock or heart fibrillation, removal of the direct current component by the inductor 202 greatly increases the safety of the device. The remaining high frequency ringing is only capable of delivering a mild electric shock, but not heart fibrillation. This factor greatly increases the safety of the device, even if the device is handled carelessly. Typical carelessness can be improper use of the safety arming switch 140.

As shown in FIG. 5, where the vertical axis 210 depicts voltage and the horizontal axis 212 depicts wavelength. The primary wave 214 is strong enough to disable the vehicle 110 (FIG. 1). The direct current wave 216 shows the decrease in the direct current wave and minimizes the injury chances of shock or fibrillation, thanks to inductor 202.

Referring back to FIG. 4, the inductor 202 optionally connects the first lead connector 160 and the second lead connector 162. This inductor 160 is connected to the first lead conductor 160 between the first spark gap 152 and the first magnet 132. If the second lead conductor 162 includes second spark gap 154, inductor 160 is connected between second magnet 134 and second spark gap 154. If the second lead conductor 162 does not include second spark gap 154, inductor 160 is connected between second magnet 134 and capacitor 150.

Figure 6:
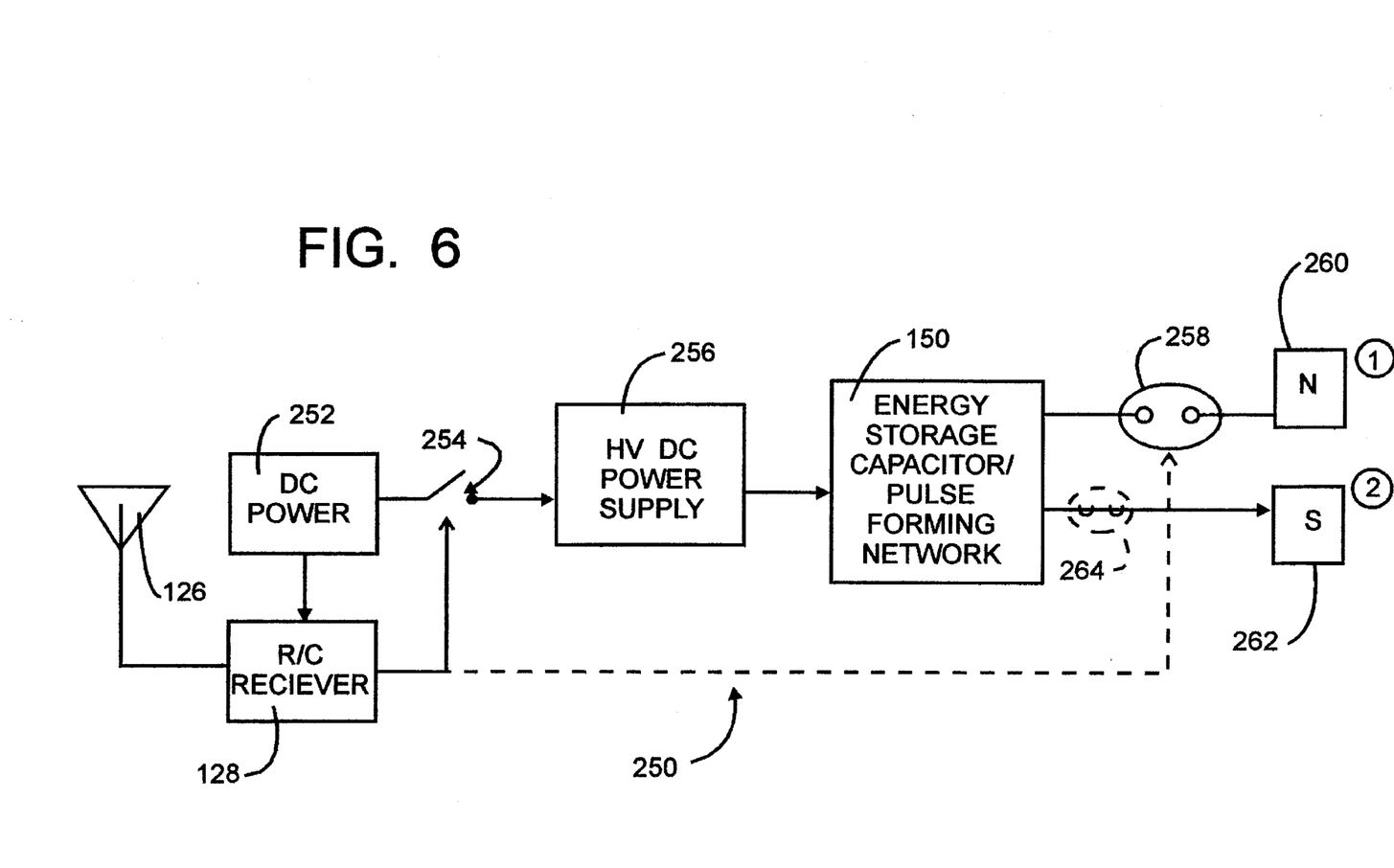
FIG. 6 depicts a third circuit 250 for device 100.

In FIG. 6, the third circuit 250 has a direct current power source 252 in standard fashion to the radio control receiver 128. There is first switch 254 connected between the direct current power source 252 and the high voltage direct current power supply 256. The high voltage direct current power 256 supply is connected in a standard fashion to the energy storage capacitor 150 or pulse forming network. This in turn is connected at one lead to the fast high voltage switch 258 and a first electrode 260.

A second electrode 262 is also standardly connected to the energy storage capacitor 150, which may optionally have a second high energy voltage 264 switch therebetween. First electrode 260 and second electrode 262 may optionally be contained in first magnet 132 and second magnet 134.

The energy storage capacitor 150 may be replaced with a pulse forming network. While the energy storage capacitor 150 is preferred, it is possible to use the pulse forming network or an equivalent device.

Figure 7:
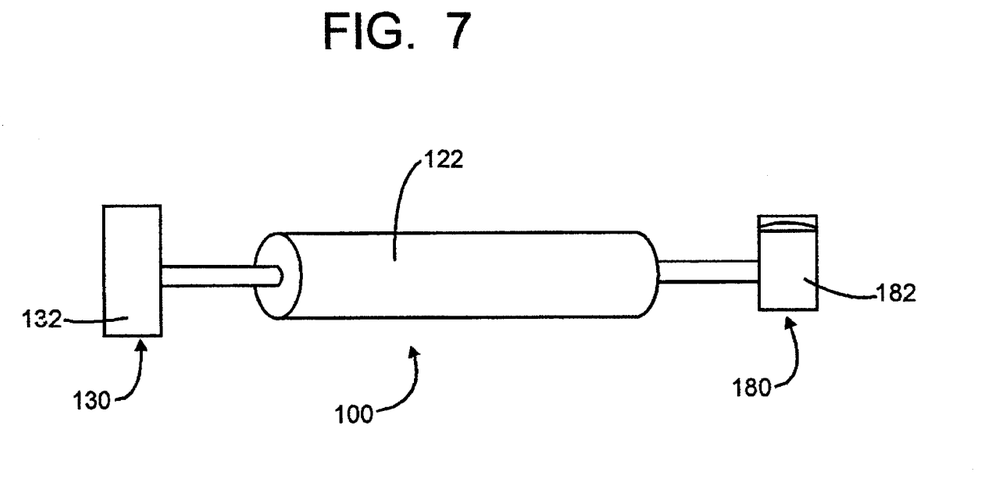
FIG. 7 depicts device 100 with a combination of magnet assembly 130 and glue assembly 180.

FIG. 7 depicts device 100 with a combination of magnet assembly 130 and glue assembly 180. Second magnet 134 is replaced in standard fashion by second glue device 182. Either device is operable. The position of second glue device 182 and first magnet 132 may be reversed.

Figure 8:
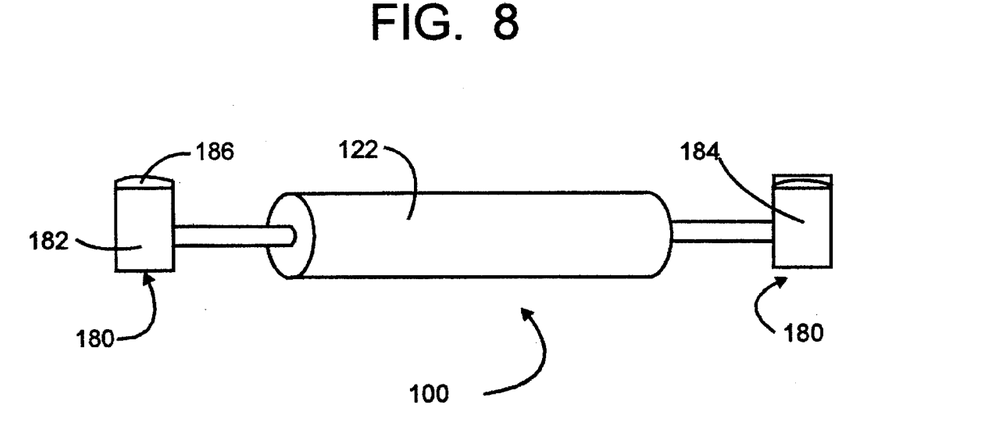
FIG. 8 depicts device 100 with a glue assembly 180.

FIG. 8 depicts device 100 with a glue assembly 180 for attachment of the device 100 to vehicle 110. Glue assembly 180 includes first glue device 182 oppositely disposed from second glue device 184 to provide for attachment of the device to a vehicle 110. Upon fracturing or removing the cover of first glue device 182 and second glue device 184, glue 186 is exposed and used to secure device 100 to vehicle 110.

The glue assembly 180 is especially useful if a silent attachment to vehicle 110 is required. With magnet assembly 130, contact with the vehicle 110 sometimes creates undesirable noise. Glue assembly 180 minimizes that noise.

In a hostage situation, a demanded vehicle 100 may have device 100 surreptitiously secured thereto. After the perpetrator has entered the vehicle 110, the remote device 156 may disable the vehicle 110 as desired.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A device, having a housing and an attaching means adaptable to attach the device to a vehicle, the device being easily attached to and concealed on the vehicle and capable of disrupting an electronic systems required for vehicle operation of the vehicle:

(a) the housing having mounted therein a direct current source, an antenna, a radio control receiver, a safety arming switch, an inverter, a high voltage switching device, two isolation resistors, and an energy storage capacitor;

(b) the housing having a first end and a second end;

(c) a first securing device being connected to the first end, the first securing device being adapted to be securable to the vehicle; and (d) a second securing device being connected to the second end, the second securing device being adapted to be securable to the vehicle.

2. The device of claim 1 further comprising:

(a) the first securing device being a first magnet; and (b) the second securing device being a second magnet.

3. The device of claim 1 further comprising:

(a) the first securing device being a first glue assembly; and (b) the second securing device being a second glue assembly.

4. The device of claim 1 further comprising:

(a) the first securing device being a magnet assembly; and (b) the second securing device being a glue assembly.

5. The device of claim 1 further comprising:

(a) the first securing device being a glue assembly; and (b) the second securing device being a magnet assembly.

6. The device of claim 1 further comprising:

(a) the direct current source being connected to the radio control receiver;

(b) the antenna being connected to the radio control receiver;

(c) the direct current source being connected to the inverter;

(d) an inverter switch being connected between the direct current source and the inverter;

(e) the radio control receiver being connected to the safety arming switch;

(f) the inverter being connected to the high voltage switching device, two isolation resistors, and an energy storage capacitor;

(g) the high voltage switching device having a first switching lead and a second switching lead; and (h) the two isolation resistors including a first isolation resistor and a second isolation resistor.

7. The device of claim 6 further comprising:

(a) the first switching lead being connected to the first isolation resistor;

(b) the second switching lead being connected to a second isolation resistor; and (c) the second switching lead and the first switching lead having an energy storage capacitor connected thereto between the first isolation resistor and the second isolation resistor, and the first securing device and the second securing device.

8. The device of claim 7 further comprising the first switching lead including a first high voltage switching means being connected between the capacitor and the first securing means.

9. The device of claim 8 further comprising the second switching lead including a second high voltage switching means being connected between the capacitor and the first securing means.

10. The device of claim 9 further comprising:

(a) an inductor being connected to the first switching lead between the first high voltage switching means and the first securing means; and (b) the inductor also being connected to the second switching lead between the second high voltage switching means and the second securing means.

11. The device of claim 8 further comprising:

(a) an inductor being connected to the first switching lead between the first high voltage switching means and the first securing means; and (b) the inductor also being connected to the second switching lead.

12. The device of claim 7 further comprising:

(a) an inductor being connected to the first switching lead between the first high voltage switching means and the first securing means;

(b) the inductor also being connected to the second switching lead; and (c) the device being capable of generating about 18,000 volts to about 22,000 volts in order to temporarily disrupt a vehicle.

13. A device, having a housing and an attaching means adaptable to attach the device to a vehicle, the device being easily attached to and concealed on the vehicle and capable of disrupting an electronic systems required for vehicle operation of the vehicle:

(a) the housing having mounted therein a direct current power source, a radio control receiver, a first switch, a high voltage direct current power supply, a pulse forming network a fast high voltage switch and a first electrode;

(b) the housing having a first end and a second end;

(c) a first securing device being connected to the first end, the first securing device being adapted to be securable to the vehicle; and (d) a second securing device being connected to the second end, the second securing device being adapted to be securable to the vehicle.

14. The device of claim 13 further comprising:

(a) the first securing device being a first magnet; and (b) the second securing device being a second magnet.

15. The device of claim 13 further comprising:

(a) the first securing device being a first glue assembly; and (b) the second securing device being a second glue assembly.

16. The device of claim 13 further comprising:

(a) the first securing device being a magnet assembly; and (b) the second securing device being a glue assembly.

17. The device of claim 13 further comprising:

(a) the first securing device being a glue assembly; and (b) the second securing device being a magnet assembly.

18. The device of claim 13 further comprising:

(a) the direct current power source being connected to the radio control receiver and the first switch;

(b) the first switch direct current power source being connected to the high voltage direct current power supply;

(c) the high voltage direct current power source being connected to the pulse forming network;

(d) the pulse forming network being connected to the fast high voltage switch and a first electrode; and (e) the fast high voltage switch being connected to the first electrode.

19. The device of claim 18 further comprising:

(a) a spark gap being connected between the fast high voltage switch and the first electrode;

(b) a second electrode being connected to the pulse forming network; and (c) a triggering mechanism being connected at one end to a point between the second electrode and the pulse forming network, and at an opposing end.

20. A method for temporarily disabling a vehicle comprising:

(a) removably securing a device to the vehicle, the device comprising a housing having mounted therein a direct current power source, a radio control receiver, a first switch, a high voltage direct current power supply, a pulse forming network a fast high voltage switch and a first electrode;

(b) remotely activating the radio control receiver;

(c) generating a pulse in the range of about 3,000 volts to about 50,000 volts;

(d) disabling the vehicle during the pulse generation; and (e) removing the vehicle from the disabling as desired.

21. A device, having a housing and an attaching means adaptable to attach the device to a vehicle, the device being easily attached to and concealed on the vehicle and capable of disrupting an electronic systems required for vehicle operation of the vehicle:

(a) the housing having mounted therein a direct current source, an antenna, an activating device, a safety arming switch, an inverter, a high voltage switching device, at least one item selected from the group consisting of a resistor and an inductor, and a pulse forming network;

(b) the housing having a first end and a second end;

(c) a first securing device being connected to the first end, the first securing device being adapted to be securable to the vehicle; and (d) a second securing device being connected to the second end, the second securing device being adapted to be securable to the vehicle.

22. The device of claim 21 further comprising:

(a) the pulse forming network is an energy storage capacitor; and (b) the at least one item selected from the group consisting of a resistor and an inductor being at least one isolation resistor.

23. The device of claim 21 further comprising the activating device being selected from the group consisting of a radio receiver, an acoustic receiver, a light receiver, an infrared receiver, and a timer.

24. A device, having a housing and an attaching means adaptable to attach the device to a vehicle, the device being easily attached to and concealed on the vehicle and capable of disrupting an electronic systems required for vehicle operation of the vehicle:

(a) removably securing a device to the vehicle, the device comprising a housing having mounted therein a direct current power source, a radio control receiver, a first switch, a high voltage direct current power supply, a pulse forming network a fast high voltage switch and a first electrode;

(b) the housing having a first end and a second end;

(c) a first securing device being connected to the first end, the first securing device being adapted to be securable to the vehicle; and (d) a second securing device being connected to the second end, the second securing device being adapted to be securable to the vehicle.

* * * * *